United States Patent [19]

Pav et al.

[11] Patent Number: 4,827,584
[45] Date of Patent: May 9, 1989

[54] PRESSURE ROLL FOR USE IN CALENDERS

[75] Inventors: Josef Pav; Reinhard Wenzel, both of Krefeld, Fed. Rep. of Germany

[73] Assignee: Kleinewefers GmbH, Krefeld, Fed. Rep. of Germany

[21] Appl. No.: 87,578

[22] Filed: Aug. 20, 1987

[30] Foreign Application Priority Data

Aug. 20, 1986 [DE] Fed. Rep. of Germany ....... 3628277
Sep. 27, 1986 [DE] Fed. Rep. of Germany ....... 3632906

[51] Int. Cl.$^4$ .............................................. B21B 13/02
[52] U.S. Cl. .................................... 29/116.2; 29/123; 29/129.5; 29/130
[58] Field of Search ............. 29/116 R, 116 AD, 123, 29/129.5, 130; 100/162 B

[56] References Cited

U.S. PATENT DOCUMENTS

| 3,290,897 | 12/1966 | Kuehn | 100/162 B |
| 3,885,283 | 5/1975 | Biondetti | 29/116 AD |
| 3,919,753 | 11/1975 | Lehmann et al. | 29/116 AD X |
| 4,106,405 | 8/1978 | Bundetti et al. | 29/116 AD X |
| 4,213,232 | 7/1980 | Biondetti | 29/116 AD |
| 4,271,575 | 6/1981 | Lehmann | 100/162 B X |
| 4,334,344 | 6/1982 | Bundetti | 29/116 AD |
| 4,394,793 | 7/1983 | Pav et al. | 29/116 AD |
| 4,429,446 | 2/1984 | Lehmann | 29/116 Ad |
| 4,520,723 | 6/1985 | Pav et al. | 29/116 AD X |

FOREIGN PATENT DOCUMENTS

| 2254392 | 12/1976 | Fed. Rep. of Germany | 29/116 AD |
| 2826316 | 12/1979 | Fed. Rep. of Germany | 29/116 AD |

Primary Examiner—Timothy V. Eley
Assistant Examiner—Frances Chin
Attorney, Agent, or Firm—Peter K. Kontler

[57] ABSTRACT

A pressure roll for use in calenders has a stationary carrier for a shell which is rotatable and movable radially of the carrier. The end portions of the shell surround antifriction bearings which, in turn, surround sleeves capable of moving radially of stubs constituting the end portions of the carrier. The sleeves are pivotally connected to the carrier for oscillatory movement about an axis which is parallel to the axis of the carrier and is angularly offset from one or more hydrostatic or otherwise configured supporting devices operating between the carrier and the shell to change the radial position of the shell and/or to change the shape of one or more selected portions of the shell. Pivotal mounting of the sleeves on the carrier reduces friction and facilitates accurate adjustment of the radial position of the shell with reference to the carrier.

63 Claims, 10 Drawing Sheets

PRESSURE ROLL FOR USE IN CALENDERS

BACKGROUND OF THE INVENTION

The present invention relates to improvements in rolls for use in calenders and like machines. More particularly, the invention relates to improvements in rolls of the type disclosed, for example, in commonly owned U.S. Pat. No. 4,520,723 granted June 4, 1985 to Pav and Wenzel. Rolls of the type to which the present invention pertains can be utilized in calenders, in glazing machines, in press sections of papermaking machines, in other pulp processing machines, in printing presses, in rolling mills for steel, plastic and/or other materials, and as pulleys and/or deflectors in conveyor systems for sieves, webs of textile material and the like.

The patent to Pav and Wenzel discloses a roll wherein a shell rotatably surrounds and is movable radially with reference to a stationary carrier in the form of a beam which is non-rotatably mounted in a frame. The shell confines one or more rows of hydrostatic supporting elements which can change the shape of the shell by reacting against the carrier. The end portions of the shell carry antifriction bearings which surround sleeves, and each such sleeve is non-rotatably but vertically movably mounted on a stub of the carrier. The means for holding the sleeves against rotation with the shell, i.e., relative to the respective stubs of the carrier, includes rollers which are received between vertical guide members on the carrier.

German Auslegeschrift No. 22 54 392 of Biondetti discloses a modified roll wherein the sleeves are formed with window-like cutouts flanked by parallel surfaces which engage flats on the respective stubs of the carrier. A similar roll is disclosed in German Auslegeschrift No. 28 26 316 of Biondetti.

A drawback of heretofore proposed devices which serve to prevent the sleeves from rotating with the shell, while permitting the sleeves to move back and forth relative to the carrier, is that the hydrostatic supporting elements which operate between the shell and the carrier must overcome pronounced friction between the carrier and the parts which hold the sleeves against rotation on the carrier. The frictional engagement between the sleeves and the carrier is especially pronounced if the sleeves have windows flanked by lateral surfaces which are in large-area contact with adjacent flats of the carrier. Thus, even a minor tilting of the sleeves can entail a jamming so that the shell is held against radial movement with reference to the carrier or can be shifted only in response to the application of very large disengaging forces which are likely to damage certain parts of the roll. The provision of rollers which are caused to travel in grooves defined by guide rails or by like parts brings about a substantial reduction of forces which are necessary to overcome friction between the rollers and the guide means on the carrier. However, the rollers are normally in a mere linear contact with the adjacent guide means; this can entail the development of pronounced Hertzian stresses and a flattening or facetting of the peripheral surfaces of the rollers with attendant increase of friction between the thus deformed rollers and the guide means on the carrier. Since the extent of such frictional engagement is unpredictable and since such frictional engagement varies as a function of several parameters, any friction between the sleeves and the carrier can diversely affect the degree of accuracy with which the orientation and/or the shape of the shell is adjusted relative to the carrier and/or with reference to one or more neighboring rolls.

OBJECTS AND SUMMARY OF THE INVENTION

An object of the invention is to provide a pressure roll wherein the friction between the sleeves and the carrier is reduced to a negligible value.

Another object of the invention is to provide a roll wherein the friction between the sleeves and the carrier can be reduced in a simple, efficient and reliable way.

A further object of the invention is to provide the roll with novel and improved means for reducing friction between the carrier and the sleeves which support antifriction bearings for the end portions of the shell.

An additional object of the invention is to provide a machine which embodies the above outlined roll.

Still another object of the invention is to provide a novel and improved carrier for use in the above outlined roll and to provide novel and improved sleeves for antifriction bearings at the ends of the shell.

A further object of the invention is to provide a novel and improved method of mounting the sleeves on the carrier for the shell of a pressure roll.

Another object of the invention is to provide the roll with novel and improved means for holding the shell against lateral movement with reference to its carrier.

An additional object of the invention is to provide novel and improved means for transmitting motion from the shell to the sleeves in response to sidewise movement of the shell with reference to its carrier.

The invention resides in the provision of a roll for use in calenders and like machines. The roll comprises an elongated carrier, a hollow cylindrical shell which surrounds and is rotatable relative to the carrier, supporting means (e.g., one or more rows of hydrostatic supporting elements) interposed between the carrier and the shell, and a tubular element (hereinafter called sleeve for short) interposed between the carrier and each end portion of the shell. The sleeves have limited freedom of movement relative to the carrier in the radial direction of the shell, and the roll further comprises means for pivotally connecting the sleeves to the carrier. The connecting means defines for the sleeves a pivot axis which is at least substantially parallel to the longitudinal extension of the carrier and is spaced apart from the supporting means in the circumferential direction of the shell. The frame of the machine can comprise means for non-rotatably holding the carrier, and the roll further comprises antifriction bearing means interposed between the sleeves and the respective end portions of the shell.

The connecting means can comprise at least one pivot member for each sleeve. The pivot members define the aforementioned axis and they can be non-rotatably secured to the carrier. The sleeves can be mounted for oscillatory movement about the respective pivot members. For example, the carrier can comprise a larger-diameter median portion within the shell, two smaller-diameter stubs which flank the median portion and are surrounded by the respective sleeves, and a substantially radially disposed shoulder between the median portion and each stub. The pivot members can include portions which project beyond the two shoulders and pivotably mount the respective sleeves. For example, each pivot member can include a first portion which is anchored in the median portion of the carrier, and a second portion which is exposed to allow for the mounting of the respective sleeve thereon.

The carrier can further comprise two retaining portions in the form of discs or washers which flank and are spaced apart from the median portion. Each sleeve is then disposed between one of the retaining portions and the respective end of the median portion. In addition to or in lieu of the aforementioned pivot members with portions extending beyond the shoulders of the median portion, the connecting means can comprise a first pivot member a portion of which projects beyond one of the retaining members and which pivotably mounts the adjacent sleeve, and a second pivot member which is coaxial with the first pivot member, which has a portion projecting beyond the other retaining member, and which pivotably mounts the other sleeve. The antifriction bearings are interposed between the sleeves and the respective end portions of the shell in the spaces between the respective ends of the median portion of the carrier and the corresponding retaining members.

The connecting means can comprise a total of four pivot members, two mounted in the median portion and projecting beyond the respective shoulders of the carrier, one mounted in one of the retaining members, and one mounted in the other retaining member. Each sleeve is then mounted on a pair of coaxial pivot members to perform angular movements in a clockwise or in a counterclockwise direction through predetermined angles depending on the play with which the stubs of the carrier extend through the respective sleeves.

Each sleeve can resemble a reel with a hollow core surrounding the respective stub of the carrier and with two flanges at the axial ends of the core. The core can be integral with one flange of the respective sleeve.

In accordance with a modification, the pivot members for the sleeves need not be directly mounted in or made integral with the median portion and/or with the retaining members of the carrier. Instead, the roll can further comprise means for movably mounting the connecting means on the carrier, preferably in such a way that the connecting means is movable with reference to the carrier in directions which are at least substantially parallel to the radial direction or directions in which the supporting means acts upon and can move the shell with reference to the carrier. For example, if the supporting means includes means for moving selected portions of or the entire shell up or down, the mounting means is designed to allow for upward and downward movements of the connecting means with reference to the carrier. Otherwise stated, the mounting means defines for the supporting means a path which is preferably parallel to the direction of the force or forces generated by the supporting means and serving to move selected portions of or the entire shell with reference to the carrier. The mounting means can comprise guide means which defines the aforementioned path and is preferably provided on the carrier (e.g., such guide means can define grooves in the aforementioned shoulders of the median portion of the carrier), and the mounting means then further comprises a carriage or slide in each groove. The connecting means can include pivot members which are mounted on the carriages and pivotably support the respective sleeves.

The sleeves can be mounted for pivotal movement with levers which are pivotable about the aforementioned axis and form part of the mounting means. Each lever has a fulcrum for the respective sleeve, and such fulcra are or can be disposed substantially diametrically opposite the pivot axis. The fulcra together define a second axis which is or can be parallel to the pivot axis, and the axes can be disposed at diametrically opposite sides of the axis of the shell. Each lever can be disposed between one of the shoulders on the carrier and the adjacent surface or end face of the respective sleeve. Alternatively, and if each sleeve is pivotably carried by two levers, one lever can be located between the adjacent shoulder and one end face of the respective sleeve, and the other lever is then located between the aforementioned retaining member for the respective sleeve and the adjacent end face of such sleeve.

Each lever can comprise a ring which surrounds the respective stub of the carrier with a certain play, i.e., with a certain freedom of pivotal or oscillatory movement with reference to the carrier. The play between the sleeves and the respective stubs can exceed the play between the stubs and the respective ring-shaped levers. At least one of the sleeves can comprise a preferably annular portion or extension which spacedly surrounds the respective ring-shaped lever with a certain amount of play, namely with a play which is preferably less than the play between the respective sleeve and the associated stub. The sum of the play between such annular portion of the one sleeve and the respective lever plus the play between the lever and the respective stub preferably exceeds the maximum play between the respective sleeve and the corresponding stub.

The roll can further comprise stabilizing means for the shell. Such stabilizing means serves to at least limit the extent of movability of the shell with reference to the carrier transversely of the direction or directions of the force or forces which are generated by the supporting means to move the shell radially with reference to the carrier. The stabilizing means can be operative between the shell and the median portion of the carrier and/or between the sleeves and the respective stubs. For example, the stabilizing means can comprise a first stabilizing unit which operates between the shell and/or one of the sleeves on the one hand and the median portion of the carrier and/or the respective stub of the carrier on the other hand, and a second stabilizing unit which operates between the median portion of the shell and/or the one sleeve on the one hand and the median portion of the carrier and/or the respective stub on the other hand. The stabilizing means can comprise hydrostatic stabilizing elements. Furthermore, the supporting means can comprise or constitute at least one of the stabilizing units. The first unit can be actuated to apply to the shell a force in a predetermined direction, and the second unit can include means for applying to the shell a force counter to the predetermined direction. At least one of the stabilizing units can comprise at least one cylinder and piston assembly which is interposed between at least one of the sleeves and the respective stub of the carrier. Such assembly can include a piston on the one sleeve, and the carrier can be provided with a cylinder chamber which receives the piston with substantial play in the circumferential direction of the one sleeve.

One or more friction bearing members can be interposed between neighboring first and second surfaces which are respectively provided on the carrier and a sleeve. The arrangement is preferably such that the friction bearing members overlie only small portions of the respective surfaces on the sleeves and carrier. Each pivot member of the connecting means can be surrounded by an annular (ring-shaped) bearing member.

The friction bearing members can include a first set of three bearing members which are interposed between one of the sleeves and the carrier, and a second set of bearing members which are interposed between the carrier and the other sleeve. The bearing members of at least one of these sets are preferably equidistant from each other in the circumferential direction of the respective sleeve.

Friction bearing members can also be interposed between the aforementioned retaining members of the carrier and the adjacent sleeves. Each retaining member normally carries a sealing ring which sealingly engages the adjacent surface of the respective sleeve, and the friction bearing members which operate between the retaining members and the adjacent sleeves are preferably surrounded by the respective sealing rings.

The novel features which are considered as characteristic of the invention are set forth in particular in the appended claims. The improved pressure roll itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
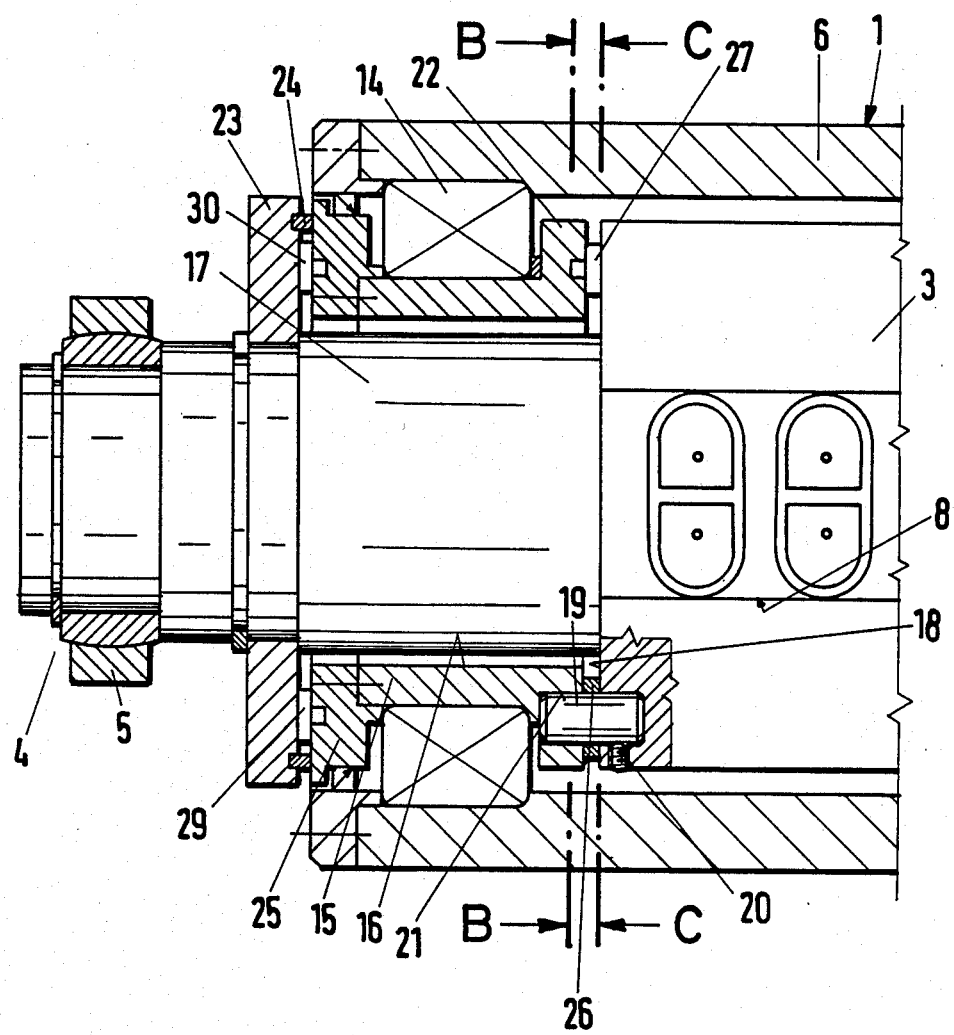
FIG. 1 is a fragmentary horizontal sectional view of a roll which embodies one form of the invention, the section being taken in the direction of arrows as seen from the line A—A of FIG. 2.
Figure 2:
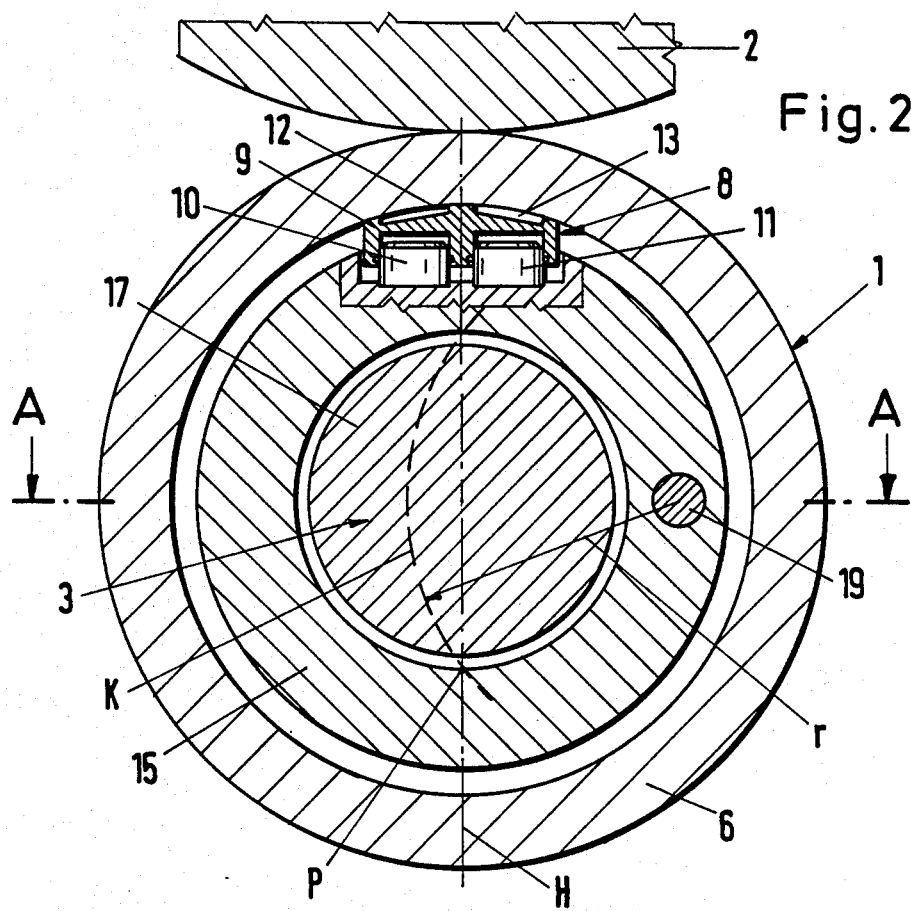
FIG. 2 is a transverse vertical sectional view as seen in the direction of arrows from the line B—B of FIG. 1.
Figure 3:
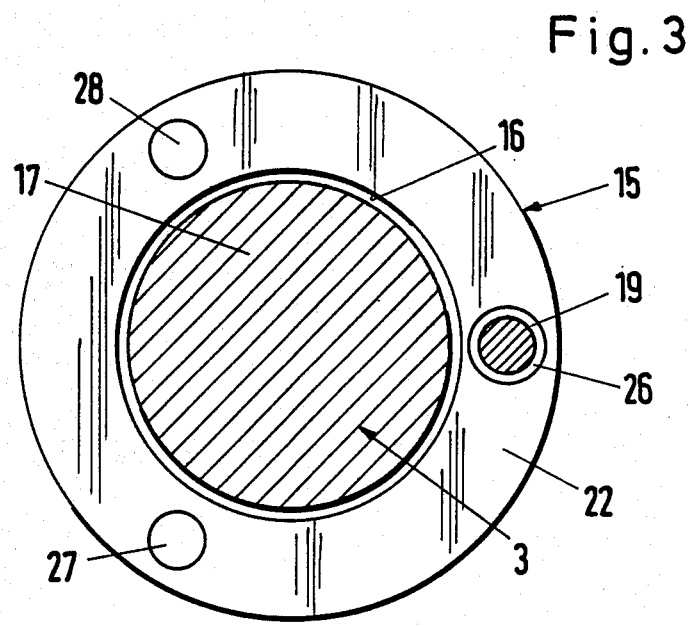
FIG. 3 is a transverse vertical sectional view as seen in the direction of arrows from the line C—C of FIG. 1.

FIGS. 1 to 3 show a portion of a pressure roll 1 which can be used with a similar or with an otherwise constructed roll 2 to define a nip for a web of paper, textile material or the like, depending upon the intended use of the rolls. The roll 1 comprises an elongated carrier 3 in the form of a beam the end portions of which are mounted in spherical bearings 4 and such bearings, in turn, are mounted in the frame 5 of the machine, e.g., a calender. One bearing 4 is provided at each end of the carrier 3, and the latter is mounted in the frame 5 in such a way that it cannot turn about its longitudinal axis. The roll 1 further comprises a hollow cylindrical shell 6 which spacedly surrounds a larger-diameter median portion of the carrier 3 in such a way that two coaxial cylindrical stubs 17 of the carrier extend beyond the respective ends of the median portion and define with the latter two radially extending annular shoulders 18. The shell 6 surrounds an elongated supporting device 8 which can be actuated in a manner not forming part of the present invention to move selected portions of or the entire shell 6 radially up and down, as seen in FIG. 2. The supporting device 8 is located at the twelve o'clock position of the shell 6 and comprises a row of aligned hydrostatic supporting elements 9 with two hydraulic cylinder and piston assemblies 10, 11 installed between each supporting element 9 and the adjacent part of the median portion of the carrier 3. The assemblies 10, 11 for each supporting element 9 are adjacent to each other in the circumferential direction of the shell 6, i.e., such assemblies are disposed at opposite sides of a vertical plane H (FIG. 2) which includes the axes of the carrier 3 and upper roll 2. The upper side of each hydrostatic supporting element 9 is formed with two pockets 12, 13 at the opposite sides of the plane H, and such pockets receive pressurized hydraulic fluid medium from the cylinder chambers of the respective assemblies 10, 11 in a manner well known from the art of pressure rolls for calenders or the like and shown, for example, in FIG. 2 of the aforementioned patent to Pav and Wenzel. Reference may also be had to U.S. Pat. No. 4,394,793 granted July 26, 1983 to Pav and Münch.

The stubs 17 of the carrier 3 are spacedly surrounded by discrete spool- or reel-like tubular elements 15 (hereinafter called sleeves for short) which, in turn, are surrounded by antifriction bearings 14 in the respective end portions of the shell 6. Each sleeve 15 has a cylindrical axial bore or hole 16 whose diameter exceeds the diameter of the respective stub 17.

The diameter of each shoulder 18 on the carrier 3 in the horizontal plane A—A of FIG. 2 exceeds the diameter in the vertical plane H because the upper part of the carrier 3 is formed with a flat for the row of hydrostatic supporting elements 9 which form part of the supporting device 8 for the shell 6. In accordance with a feature of the invention, each radial shoulder 18 of the median portion of the carrier 3 has a blind bore or hole which is parallel to the axis of the carrier and receives a portion of a pivot member 19 forming part of a means for connecting the sleeves 15 to the carrier 3 for angular movement about a pivot axis which is common to the two pivot members 19 and is parallel to the axis (longitudinal extension) of the carrier 3. In accordance with an additional feature of the invention, the axis which is defined by the pivot members 19 is angularly offset with reference to the supporting device 8, preferably by approximately or exactly 90 degrees. Thus, the common axis of the pivot members 19 (of which only one can be seen in FIGS. 1 to 3) is located in a horizontal plane which includes the axis of the carrier 3. Each pivot member 19 is held in the selected axial position by a radially extending grub screw 20 or in any other suitable way. Furthermore, each pivot member 19 is axially slidably received in a registering bore or hole 21 in the adjacent flange 22 of the respective sleeve 15. While the screws 20 hold the pivot members 19 against rotation in the respective bores of the median portion of the carrier 3, the sleeves 15 are free to oscillate about the respective pivot members 19 clockwise and counterclockwise as seen in FIGS. 2 or 3.

Each sleeve 15 further comprises a cylindrical median portion in the form of a hollow core which spacedly surrounds the respective stub 17, and a separable flange 25. As shown in FIG. 1, the core of the illustrated sleeve 15 is integral with the right-hand flange 22. The antifriction bearing 14 is located between the flanges 22 and 25.

In the absence of any obstructions, the sleeve 15 which is shown in FIG. 2 could pivot about the axis of the respective pivot member 19 between an upper end position in which the surface surrounding its axial bore 16 would abut the respective stub 17 at the six o'clock position and a lower end position in which the surface surrounding the bore 16 would abut the stub 17 at the twelve o'clock position. When the sleeve 15 is caused to pivot about the axis of its pivot member 19, each portion of such sleeve moves along an arcuate path whose center of curvature is located on the axis of the pivot member 19. FIG. 2 shows by broken lines a portion of a circle K having a radius r and denoting the path of movement of a point P of the sleeve 15. The point P is located on the internal surface of the sleeve and such point is disposed in the vertical symmetry plane H when the sleeve 15 assumes the position of FIG. 2 in which its axis coincides with the axis of the respective stub 17.

It will be appreciated that the sleeve 15 is highly unlikely to jam since it is not confined to reciprocatory movements, i.e., it can pivot about the common axis of the pivot members 19 whenever the shell 6 is caused to move up or down under the action of the supporting device 8, by gravity and/or under the action of the roll 2 and/or the material which is caused to run through the nip of the rolls 1 and 2. The only friction which develops is between the periphery of the pivot member 19 and the surface in the registering bore or hole 2 of the flange 22. Such friction is negligible, especially when compared with friction which develops when a sleeve is confined to reciprocatory movements by causing two parallel flat surfaces in the interior of the sleeve to slide along two parallel flats of the carrier as disclosed in the aforementioned published German applications of Biondetti. Friction between the pivot member 19 and the surface bounding the bore 21 of the flange 22 is negligibly small on the additional ground that only a small fraction of such friction opposes a movement of the sleeve 15 in directions to raise or lower the shell 6, i.e., in or counter to the direction of forces which are generated by the supporting device 8 and act upon portions of or upon the entire shell 6.

Each pivot member 19 constitutes a means for preventing rotation of the respective sleeve 15 about the corresponding stub 17, i.e., the sleeve can merely pivot, oscillate or perform a pendulum movement about an axis which is remote from the plane H and is angularly offset with reference to the supporting device 8. Therefore, the extent of movement of the sleeve 15 with reference to a sealing ring 24 (FIG. 1) is very small. The sealing ring 24 is mounted on or in a disc-shaped retaining member 23 which is non-rotatably secured to and can be said to form part of the stub 17. The ring 24 sealingly engages the adjacent surface of the flange 25. As shown, the ring 24 can be recessed into that surface of the retaining member 23 which confronts the adjacent sleeve 15.

That surface of the flange 22 which confronts the adjacent shoulder 18 of the median portion of the carrier 3 supports three friction bearing members 26, 27, 28 which are equidistant from each other (see FIG. 3) in the circumferential direction of the sleeve 15. The friction bearing member 26 is a ring which surrounds the respective pivot member 19. The bearing members 26-28 are preferably made of a material with a low coefficient of friction, such as bronze. The members 27, 28 are relatively small discs. The combined area of surface-to-surface contact between the bearing members 26-28 and the adjacent shoulder 18 is a very small fraction of the area of such shoulder and/or of the area of that surface of the flange 22 which supports the members 26-28.

A set of three equidistant friction bearing members is also installed between the right-hand surface of the retaining member 23 and the adjacent left-hand side of the flange 25, as seen in FIG. 1. Such retaining members are disposed within the confines of the sealing ring 24. FIG. 1 merely shows two of these friction bearing members, namely the members 29 and 30. Again, the combined area of contact between the friction bearing members within the confines of the sealing ring 24 and the adjacent surface of the retaining member 23 or the adjacent surface of the flange 25 is a small fraction of the total area of such surface.

An advantage of the friction bearing members is that the number of surfaces which must be machined with a high degree of precision can be reduced with attendant savings in initial cost. Thus, if the bearing members 26-28 are bonded or otherwise affixed to the flange 22, the respective surface of this flange need not be machined with a high degree of precision; it suffices to machine the adjacent shoulder 18. Analogously, if the friction bearing members including the members 29, 30 are secured to the flange 25, the respective surface of this flange need not be machined with a high degree of accuracy; it suffices to machine the adjacent surface of the retaining member 23.

The improved pressure roll exhibits the advantage that the area of direct or indirect frictional engagement between the carrier 3 and the sleeves 15 is reduced to a minute fraction of that frictional engagement which is required in conventional pressure rolls to ensure that the sleeves cannot rotate on the carrier. As can be seen in FIG. 2, the extent to which the path of movement of any point on a pivotably mounted sleeve 15 deviates from the ideal path (which is located in or is parallel with the plane H) is negligible, and such minute departure from the ideal path is clearly warranted in view of the aforediscussed substantial reduction of friction. Thus, the only locus of friction is that between the cylindrical peripheral surface of the left-hand portion of the pivot member 19 of FIG. 1 and the cylindrical surface bounding the hole or bore 21 in the adjacent flange 22 of the sleeve 15. Such engagement between two cylindrical surfaces actually excludes any possibility of jamming or seizing. Moreover, and since the axis of the pivot member 19 is remote from the plane H, the sleeve 15 acts not unlike a lever for the respective end portion of the shell 6 and the effective friction between the surfaces of the pivot member 19 and flange 22 is only a negligible fraction of overall friction between such surfaces.

A pronounced reduction of friction between the sleeves 15 and the carrier 3 renders it possible to adjust the shape and/or the position of the shell 6 with reference to the carrier 3 and roll 2 with a much higher degree of accuracy than in conventional calenders and like machines which employ pressure rolls. This will be readily appreciated since friction between the pivot members 19 and the respective sleeves 15 is small or negligible so that the supporting means 8 must not overcome frictional, clamping and/or cohesion-inducing forces which are different at the two axial ends of the shell 6 as is the case in conventional pressure rolls. Accurate adjustments of the configuration and/or position of the shell 6 with reference to the roll 2 are of importance to the quality of the material which is caused to pass through the nip of the shell 6 and roll 2 when the machine embodying the roll 1 is in actual use.

It is presently preferred to mount the pivot members 15 in such a way that they are non-rotatably held in the larger-diameter median portion of the carrier 3 and are rotatable in the holes or bores 21 of the respective flanges 22. The reason is that such mounting of the pivot members 19 (as contrasted with a rigid mounting in the sleeves 22) results in a reduction of the shortest distance between a plane passing through the axis of a sleeve and the peripheral surface of the respective pivot member 19. This greatly reduces the likelihood of a change of orientation (inclination of the axis of the sleeves 15 with reference to the common axis of the stubs 17) even if each sleeve is mounted on a single pivot member (compare with FIG. 4 wherein each sleeve is pivotable about the common axis of two aligned pivot members).

The mounting of pivot members 19 in blind bores or holes which are provided in the radially extending shoulders 18 of the median portion of the carrier 3 is desirable and advantageous because the provision of bores or holes in this part of the carrier does not entail an undue weakening of the carrier, and also because the lever arm (distance between the axis of a pivot member 19 and the plane H) can be selected within a wide range. FIG. 2 shows that the pivot members 19 can be placed close to the periphery of the median portion of the carrier 3, i.e., they can be as remote from the common axis of the stubs 17 as the parts of the supporting means 8 since the latter is installed in a flattened portion of the carrier 3 and is angularly offset from the pivot members 19.

The angular positions of the friction bearing members 26-28 need not be selected in a manner as shown in FIG. 3. For example, these bearing members can be placed at the one, five and nine o'clock positions. The distribution which is shown in FIG. 3 is preferred because one (26) of the friction bearing members need not be bonded or otherwise positively secured to the flange 22. The number of friction bearing members in each set can be increased to four or more or reduced to two. The utilization of sets of three equidistant bearing members each (i.e., with an angular spacing of 120°) is preferred at this time because this renders it possible to achieve a highly satisfactory (threepoint) engagement of the shoulders 18 and the surfaces of the retaining members 23 with a relatively small number of bearing members.

The mounting of certain friction bearing members (including the members 29 and 30) within the confines of the respective sealing rings 24 is of advantage because the lubricant which is confined by the sealing rings 24 simultaneously serves to lubricate the bearing members. The lubricant is confined in the interior of the shell 6 and can reach the space within the sealing rings 24 by flowing along the peripheral surfaces of the stubs 17. The friction bearing members including those numbered 29 and 30 ensure that the sealing rings 24 need not take up any, or any appreciable, stresses but are merely called upon to perform their sealing function because the stresses are taken up by the friction bearing members within the confines of the sealing rings.

Figure 4:
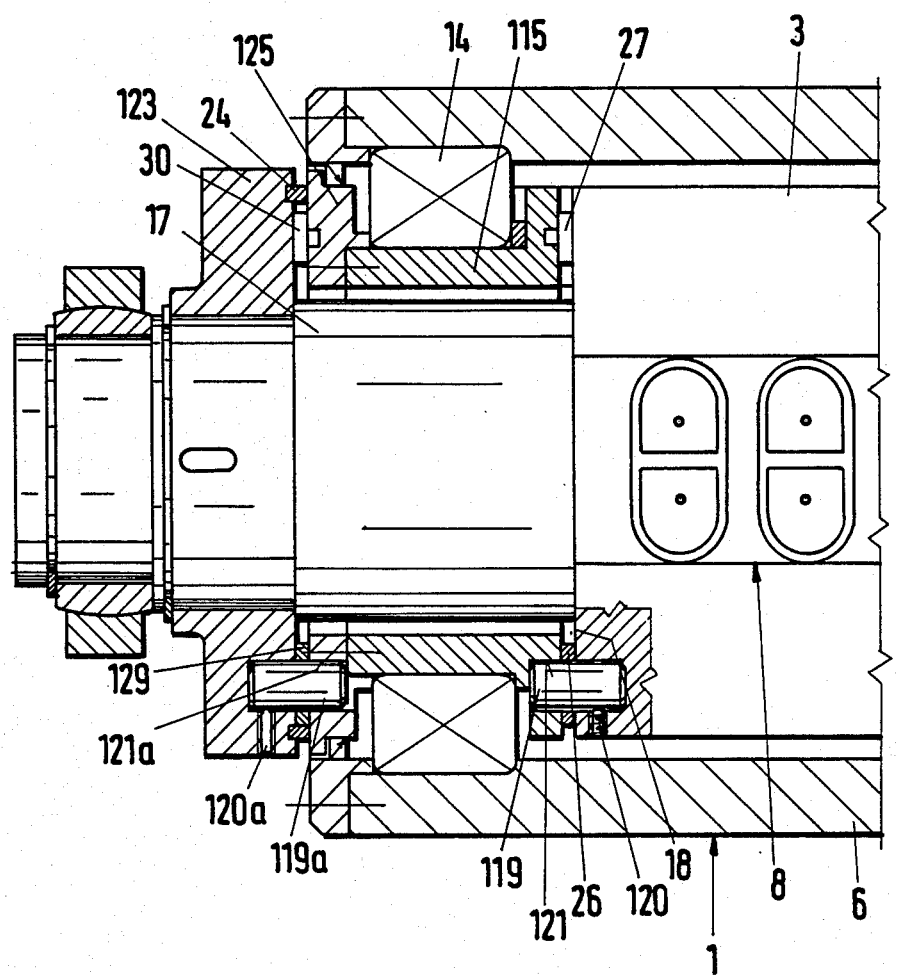
FIG. 4 is a fragmentary horizontal sectional view of a second roll.

FIG. 4 shows a portion of a modified pressure roll 1 wherein all such parts which are identical with the corresponding parts of the roll 1 of FIGS. 1-3 are denoted by similar reference characters. The sleeve 115 is pivotable about an axis which is parallel to the longitudinal extension of the carrier 3 and is defined by two aligned pivot members 119, 119a. A portion of the pivot member 119 is recessed into the shoulder 18 of the median portion of the carrier 3 and is held in the carrier in a fixed axial and angular position by a grub screw 120. The left-hand portion of the pivot member 119 is received in a bore or hole 121 in the adjacent flange of the sleeve 115; the latter can turn clockwise and counterclockwise about the pivot member 119.

The pivot member 119a is received in an axially parallel blind bore or hole of the retaining member 123 and is held against axial and angular movement by a grub screw 120a. The right-hand portion of the pivot member 119a extends into a hole or bore 121a in the detachable left-hand flange 125 of the sleeve 115. The retaining member 123 is non-rotatably secured to the stub 17 of the carrier 3; as mentioned above, the retaining member 123 can be considered an integral or separable part of the carrier. The antifriction bearing 14 which surrounds the sleeve 115 is spaced apart from the pivot members 119, 119a in the axial direction of the shell 6.

An advantage of the roll 1 which is shown in FIG. 4 is that the orientation of the sleeve 115 with reference to the carrier 3 remains unchanged even if the roll 1 is subjected to extremely high stresses. This is due to the fact that the sleeve 115 is pivotally mounted at each of its axial ends. Moreover, the diameters of the pivot members 119, 119a can be smaller than that of the pivot member 19 because the force which is to be taken up by the connecting means for the sleeve 115 is divided between two pivot members.

The distribution and configuration of friction bearing members (note the members 26, 27 and 30) is or can be the same as described in connection with FIGS. 1 to 3. The member 29 of FIG. 1 is replaced with an annular member 129 which surrounds the pivot member 119a and is surrounded by the sealing ring 24.

It will be understood that the other sleeve (not shown in FIG. 4) at the right-hand end of the shell 6 is constructed and mounted in the same way as the just described sleeve 115. The structure at the right-hand end of the shell 6 of FIG. 4 is a mirror image of the structure which is shown in FIG. 4.

The dimensions of the retaining members 123 can be readily selected in such a way that the pivot members 119a are mounted at a desired optimum distance from the vertical plane including the axis of the carrier 3.

The provision of sleeves which resemble spools and have hollow cylindrical cores between two radially outwardly extending flanges is desirable if the pivot members 19 or 119, 119a are to be located at a considerable distance from the plane H.

Figure 5:
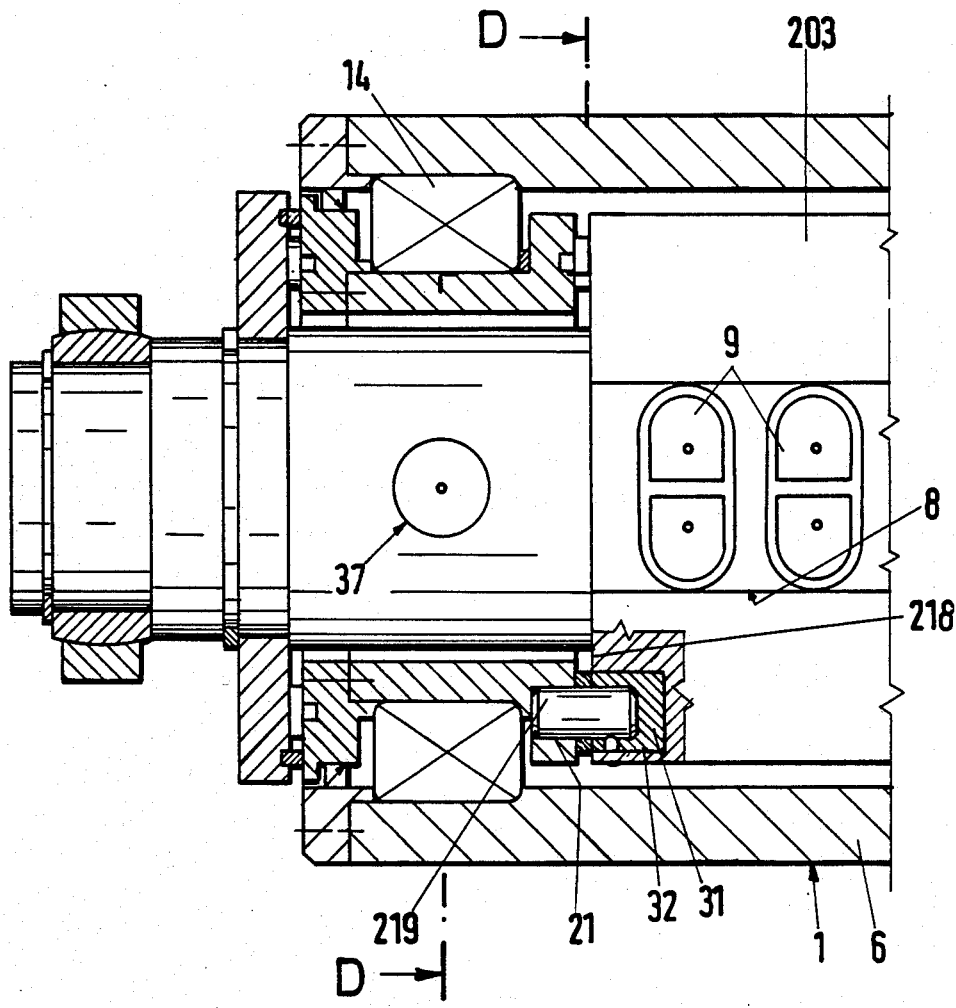
FIG. 5 is a similar fragmentary horizontal sectional view of a third roll.

Referring to FIGS. 5 an 6, there is shown a pressure roll 1 which employs a somewhat modified carrier 203 with a shoulder 218 having a mounting means including a guide means 32 and a slide or carriage 31 which receives the right-hand portion of a pivot member 219 serving as a means for movably connecting the sleeve 215 to the carrier. The carriage 31 is movable in the guide means 32 (such as a straight groove in the shoulder 118) up or down in parallelism with the direction (in the plane H) in which the supporting device 8 of the roll 1 acts upon the shell 6. The pivot member 219 is non-rotatably secured to the carriage 31 by one or more screws or other suitable fastener means.

The hydrostatic supporting elements 9 of the supporting device 8 form a row which is parallel to the axis of the carrier 203 and is located at the twelve o'clock position of the shell 6. These supporting elements constitute a component of the primary unit of a stabilizing assembly which further includes a secondary unit 33 in the illustrated sleeve 215. The secondary unit 33 acts upon the sleeve 215 (in the plane H) in a direction counter to that of the action of the primary unit or supporting device 8. The unit 33 includes a piston 34 which is rigid with the sleeve 215 and extends with play (as seen in the circumferential direction of the sleeve 215) into a cylinder chamber or socket 35 in the periphery of the respective stub 217. The cylinder chamber 35 can receive pressurized hydraulic fluid by way of a channel or bore 36 which is provided in the carrier 203 and is connected to a source of pressurized hydraulic fluid by way of adjustable pressure and flow regulating means, e.g., in a manner as shown in FIG. 2 of the aforementioned patent to Pav and Wenzel.

Figure 6:
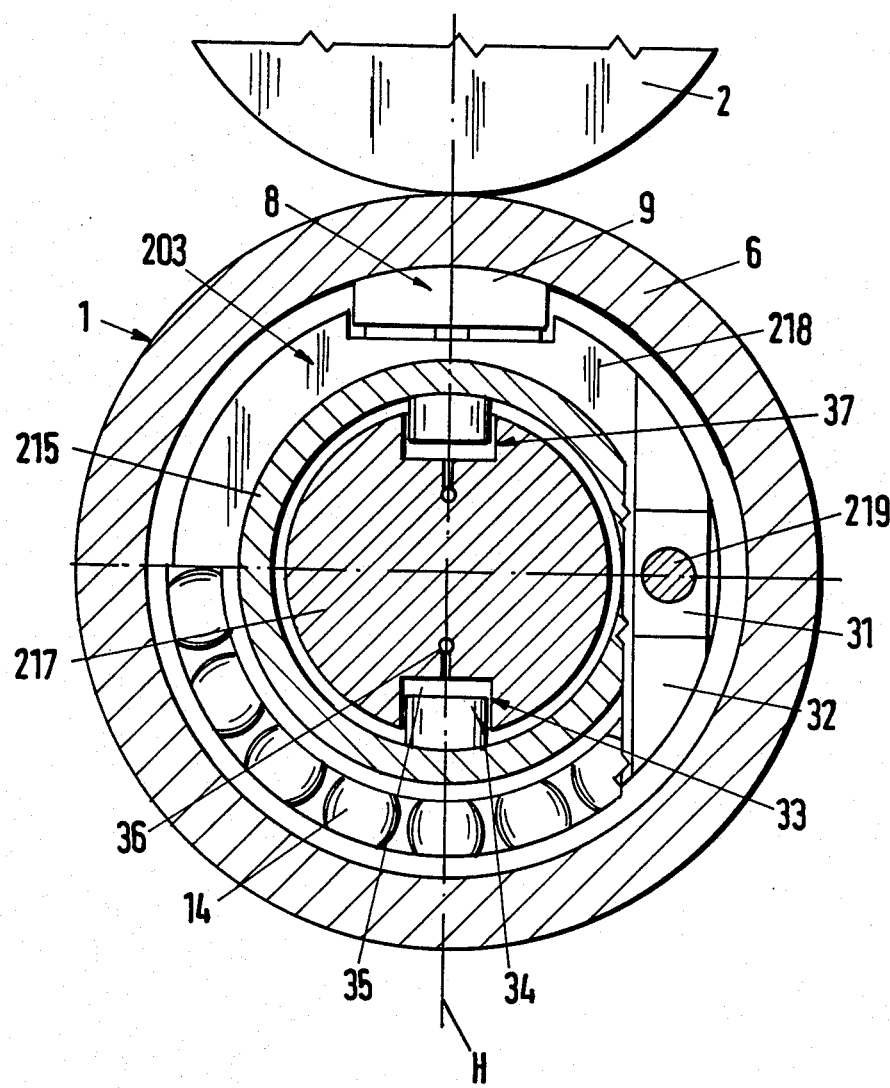
FIG. 6 is a transverse vertical sectional view as seen in the direction of arrows from the line D—D of FIG. 5.

FIG. 6 further shows a primary stabilizing unit 37 which is or can be a mirror image of the unit 33 and is installed within the confines of the sleeve 215 and can also receive pressurized hydraulic fluid at a constant or at a variable pressure from a suitable source by way of a channel in the carrier 203.

The play between the pistons and surfaces bounding the cylinder chambers of the stabilizing units 33 and 37 is selected in such a way that the sleeve 215 is free to pivot about the axis of the pivot member 219 within limits which are imposed by the neighboring parts. It is further possible to seal the cylinder chambers of the stabilizing units 33 and 37 so as to fix the sleeve 215 and the respective end portion of the shell 6 in a selected position with reference to the stub 217. To this end, the channels which connect such cylinder chambers with the respective source or sources of pressurized hydraulic fluid will contain suitable shutoff valves, not shown.

When the roll 1 of FIGS. 5 and 6 is in use, the sleeve 215 preferably pivots about the axis of the pivot member 219 in the same way as described for the sleeves 15 and 115. However, if the supporting device 8 is caused to shift the shell 6 in an upward or in a downward direction through a considerable distance, the sleeve 215 shares such upward or downward movement of the shell 6 and causes the carriage 31 and the pivot member 219 to slide in the groove 32 of the shoulder 218 in parallelism with the direction of action of the supporting device 8. The tendency of the shell 6 to move at right angles to the plane H is counteracted by the cylinder and piston assemblies of the supporting device 8 which is or can be identical with the supporting device of FIG. 1. Thus, the hydrostatic supporting elements 9 are held by the pistons of the cylinder and piston assemblies 10, 11 so that the shell 6 cannot stray sideways in a direction to move its axis out of or far away from the plane H. The resistance which the shell 6 offers to lateral movement can be increased by raising the fluid pressure in the supporting device 8 and in the secondary stabilizing unit 33 within the sleeve 215. Such regulation of the resistance of device 8 and unit 33 to lateral movements of the shell 6 reduces the magnitude of forces acting upon the pivot member 219 and its carriage 31. The magnitude of transverse forces acting upon the pivot member 219 decreases with increasing angular displacement of the sleeve 215 from its central or neutral position until the magnitude of such forces decreases to zero or practically to zero; at such time, the carriage 31 encounters no resistance or a minimum of resistance to a movement in the groove 32.

The carriages 31 for the pivot members 219 are desirable in rolls wherein the shell 6 is to cover a considerable distance with reference to the carrier 203 (as considered in the radial direction of the stubs 217). Thus, the sleeves 215 can share the up- and down-movements of the respective carriages 31, and the sleeves are also free to pivot (within limits) relative to the corresponding pivot members 219 (which share the reciprocatory movements of the carriages). Such dual movability of the sleeves 215 renders it possible to maintain the axes of the sleeves even nearer to the plane H, regardless of the selected level of the shell 6.

When the desired change of the level of the shell 6 is relatively small, the carriages 31 remain or can remain idle (i.e., they do not move up or down along their respective guide means 32) and the change of the level is carried out solely as a result of pivoting of the sleeves 215 about the axes of the respective pivot members 219. However, if the level of the shell 6 is to be altered to a considerable extent, the carriages 31 are caused to slide along their guide means 32 and the remaining adjustments are made by causing the sleeves 215 to pivot about the axes of their respective pivot members 219.

The primary unit or units (37) of the stabilizing means for the sleeves 215 are those units which act in the direction of action of the hydrostatic supporting device 8. In the roll 1 of FIGS. 5 and 6, the primary stabilizing unit 37 is part of a composite primary stabilizing unit which further includes the supporting means 8. This composite primary stabilizing unit cooperates with the secondary stabilizing unit 33 which acts counter to the direction of action of the composite unit 8, 37 and cooperates with the primary unit to limit lateral radial movements of the shell 6 and sleeves 215 with reference to the carrier 203. The purpose of the stabilizing units is to reduce the tendency of the carriages 31 to bear against the adjacent surfaces of the respective guide means 32, i.e., to facilitate sliding movements of the carriages in parallelism with the plane H. Moreover, such lateral stabilizing of the sleeves 215 reduces the stresses upon the pivot members 219 to thereby reduce friction between the pivot members and the sleeves 215 and to even further enhance the accuracy of adjustability of the shell 6 with reference to the carrier 203 and an adjacent roll 2. It has been found that the provision of primary and secondary stabilizing units ensures that the carriages 31 automatically move in the respective guide means 32 in response to an upward or downward movement of the shell 6 so that a coarser adjustment of the level of the sleeves 215 is achieved as a result of movement of the carriages 31 and a more accurate adjustment of the positions of the sleeves 215 is achieved as a result of pivoting of the sleeves about the respective pivot members 219. As the extent of vertical movement of the shell 6 increases, the magnitude of lateral forces which are generated by the stabilizing means and are applied to the shell 6 also increases, and this relieves or practically reduces to zero the stresses upon the carriages 31 which are then free to slide along their respective guide means 32.

The primary stabilizing unit 37 can be omitted because the supporting device 8 can be readily designed in such a way that it can take up substantial lateral forces. This is due to the fact that the supporting device 8 can comprise hydrostatic bearing elements 9 each of which is propped by two cylinder and piston assemblies 10, 11 which are located at opposite sides of the plane H. As mentioned above, such supporting means are described in considerable detail in the patent to Pav and Münch.

Figure 8:
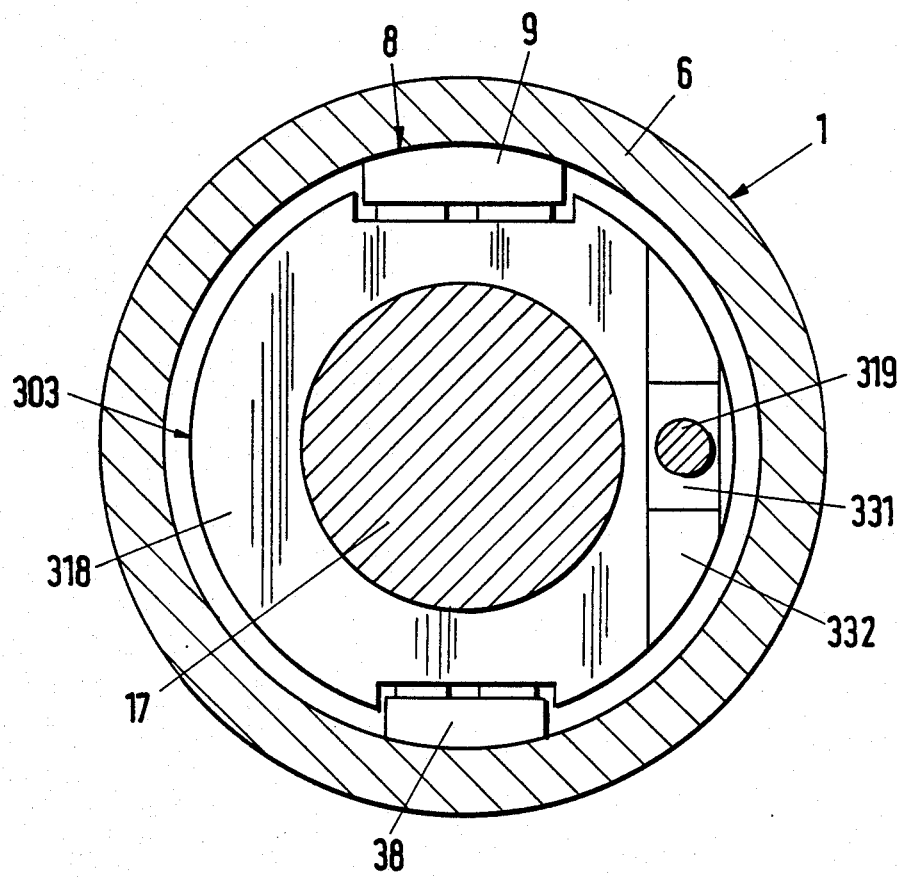
FIG. 8 is a transverse vertical sectional view as seen in the direction of arrows from the line E—E of FIG. 7.

As a rule, or at least in many instances, it suffices if the primary stabilizing unit or units take up lateral forces and the secondary stabilizing unit or units merely ensure the establishment of the desired tensioning action. The secondary stabilizing unit or units can be disposed between the carrier and the shell (as shown in FIG. 8) or such secondary unit or units can include a discrete secondary unit between each sleeve and the respective stub and, if necessary, a secondary unit between the shell and the carrier. In other words, the secondary stabilizing unit or units can be used to merely act in the plane H without taking up any, or any pronounced, lateral forces, or the secondary unit or units can be designed to apply a force counter to that which is generated by the main supporting means 8 as well as to take up pronounced lateral stresses and thus hold the sleeves against movements transversely of the plane H.

The installation of a secondary unit 33 directly between the sleeve 215 and the adjacent stub 217 exhibits the advantage that the sleeve cannot turn with reference to the primary and/or secondary unit. As shown, the sleeve can actually carry a component of the cylinder and piston assembly which constitutes the secondary stabilizing unit 33. The large clearance between the periphery of the piston 34 and the surface bounding the chamber 35 in the stub 217 ensures that the sleeve 215 has the required freedom of pivotal movement about the axis of the pivot member 219.

Figure 7:
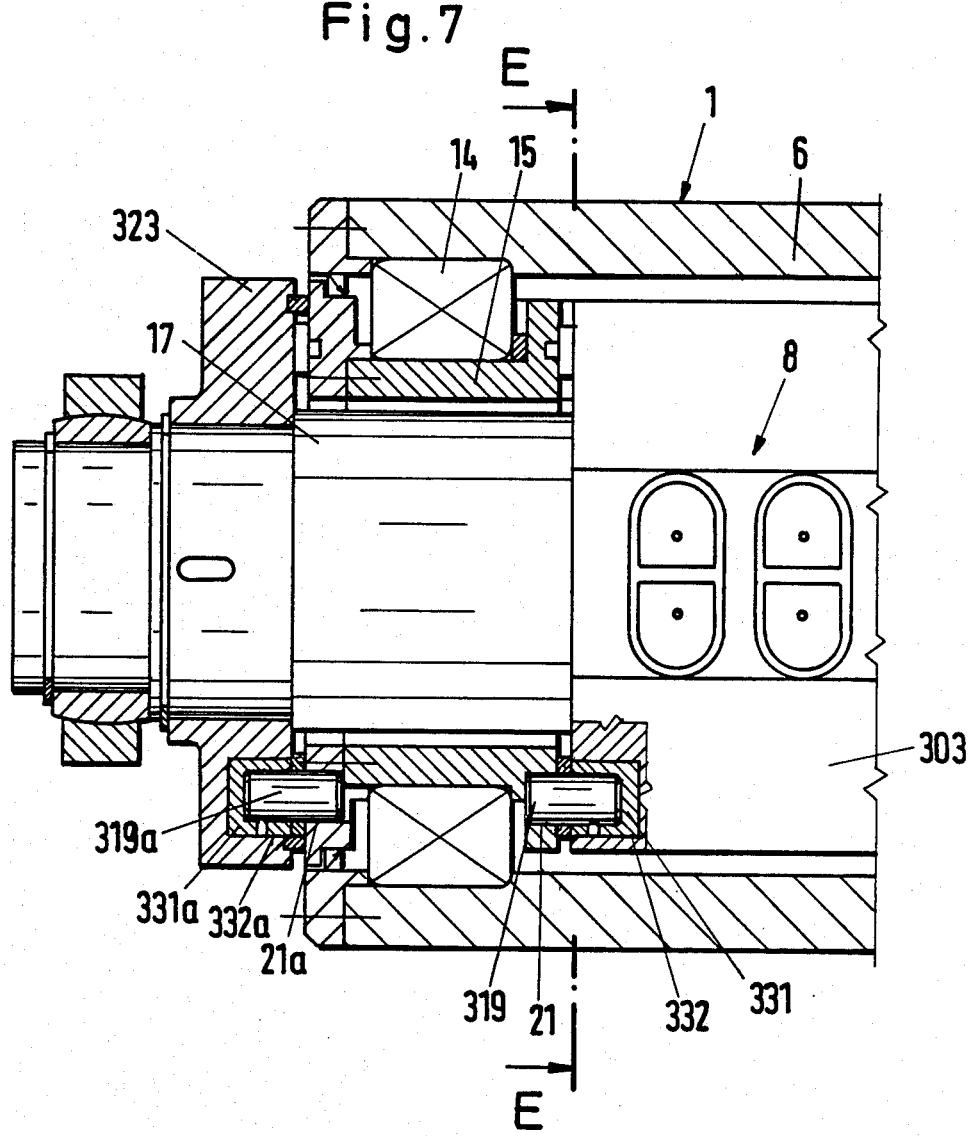
FIG. 7 is a fragmentary horizontal sectional view of a fourth roll.

The pressure roll 1 of FIGS. 7 and 8 constitutes a modification of the roll which is shown in FIG. 4. The primary unit of the stabilizing means of this roll comprises the supporting device 8 at the twelve o'clock position of the median portion of the carrier 303 and the secondary unit includes a supporting device 38 diametrically opposite the primary supporting device 8. The sleeve 15 is pivotably mounted on two coaxial pivot members 319, 319a. The pivot member 319 is mounted in a carriage 331 slidable in a guide groove 332 machined into the respective shoulder 318 of the carrier 303, and the pivot member 319a is mounted in a carriage 331a in a guide groove 332a which is machined into the adjacent surface of the retaining member 323. The guide grooves 332, 332a are parallel to each other and to the direction of forces which are generated by the primary and secondary stabilizing means 8, 38, i.e., by the primary and secondary supporting means for the shell 6.

The structure which is shown in FIGS. 7 and 8 even further reduces the likelihood of changes of inclination of the sleeves 15 with reference to the carrier 303 because each sleeve is pivotable about two coaxial pivot members and each such pivot member is movable in parallelism with the plane H (not shown in FIG. 8) to thus allow for extensive adjustments of the position of the shell 6 with reference to the carrier.

FIGS. 9 to 12 show a portion of a further pressure roll 1 which constitutes a further modification of the roll of FIG. 4. The pivot members 419 and 419a constitute fulcra which are mounted in the respective flanges 422, 425 of the sleeve 415. This sleeve is pivotable about the common axis of the pivot members 419, 419a and also about the common axis of pivot members 435, 435a which are respectively mounted in the median portion and in the retaining member 423 of the carrier 403. The means for articulately connecting the pivot member 419 to the pivot member 435 includes a first ring-shaped lever 434, and the means for articulately connecting the pivot member 419a to the pivot member 435a comprises a second ring-shaped lever 434a. The flange 422 has a bush 433 for the left-hand portion of the pivot member 419, the blind bore in the shoulder 418 of the median portion of the carrier 403 has a bush 436 for the right-hand portion of the pivot member 435, the flange 425 has a bush 433a for the right-hand portion of the pivot member 419a, and the retaining member 423 has a bush 436a for the left-hand portion of the pivot member 435a. The bores 421, 421a are respectively provided in the bushes 433, 433a. The lever 434 is located between the shoulder 418 and the adjacent surface or end face 437 of the flange 422, and the lever 434a is located between the surface or end face 438 of the flange 425 and the surface 439 of the retaining member 423.

Figure 9:
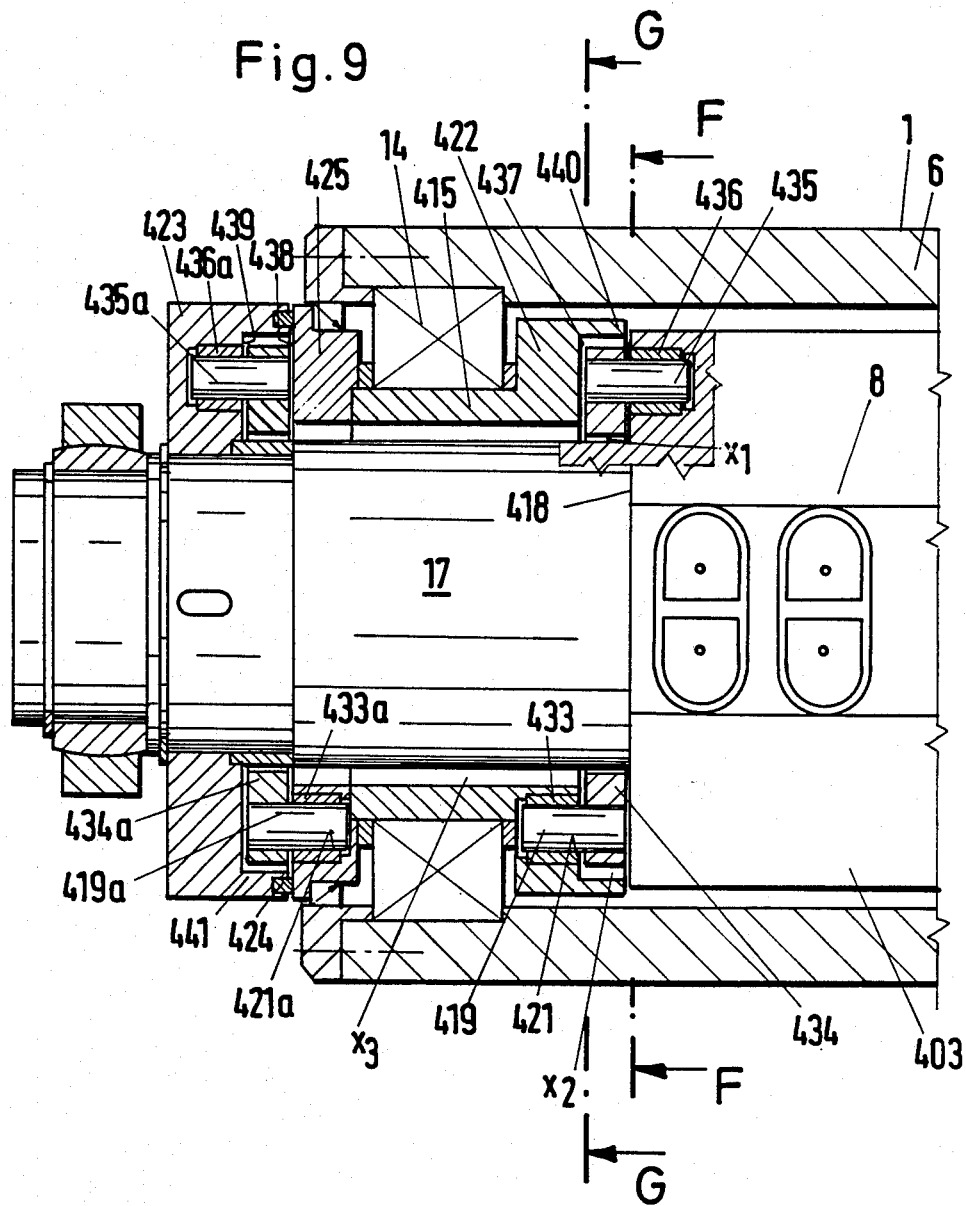
FIG. 9 is a fragmentary horizontal sectional view of a fifth roll.

The flange 422 has a cylindrical portion or extension 440 which projects beyond the surface 437 and spacedly surrounds the lever 434 with a predetermined amount of play. A similar cylindrical portion or extension 441 is provided on the retaining member 423 and projects beyond the surface 439 to spacedly surround the lever 434a with a certain amount of play. The sealing ring 424 is recessed into the right-hand end face of the extension 441 (as seen in FIG. 9).

The clearance or play between the ring-shaped lever 434 and the stub 17 of the carrier 403 is shown at $x_1$; this play determines the maximum pivotal movement of the lever 434. The play between the lever 434 and the extension 440 is shown at $x_2$; this play determines the maximum relative stroke of the lever 434. The play or clearance between the sleeve 415 and the stub 17 is shown at $x_3$; this play determines the maximum pivotal movement of the sleeve 415. The play $x_3$ is less than the sum of $x_1$ and $x_2$ but is greater than $x_1$ or $x_2$ alone. This entails that, when the shell 6 assumes its lowermost position with reference to the carrier 403, the levers 434 and 434a abut the stub 17 (note FIG. 11) and the sleeve 415 also abuts the stub 17 (FIG. 12). At such time, a small clearance still remains between the extension 440 and the lever 434, 434a (FIG. 11).

Figure 10:
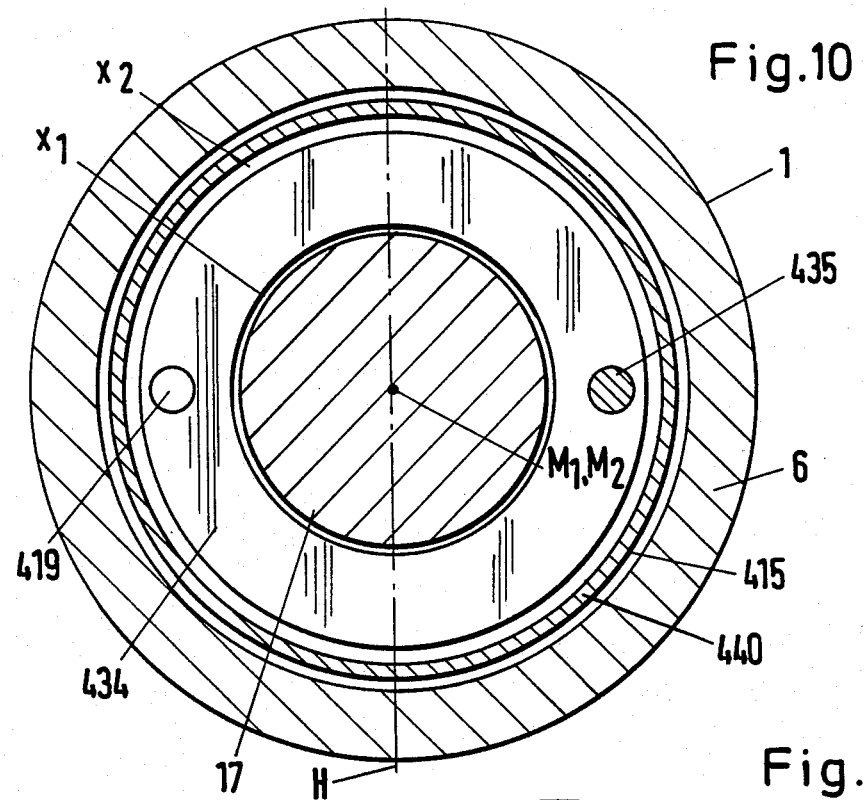
FIG. 10 is a transverse vertical sectional view as seen in the direction of arrows from the line F—F of FIG. 9.

FIG. 10 shows the ring-shaped lever 434 in the central or neutral position in which the axis $M_1$ of the sleeve 415 coincides with the axis $M_2$ of the stub 17.

Figure 11:
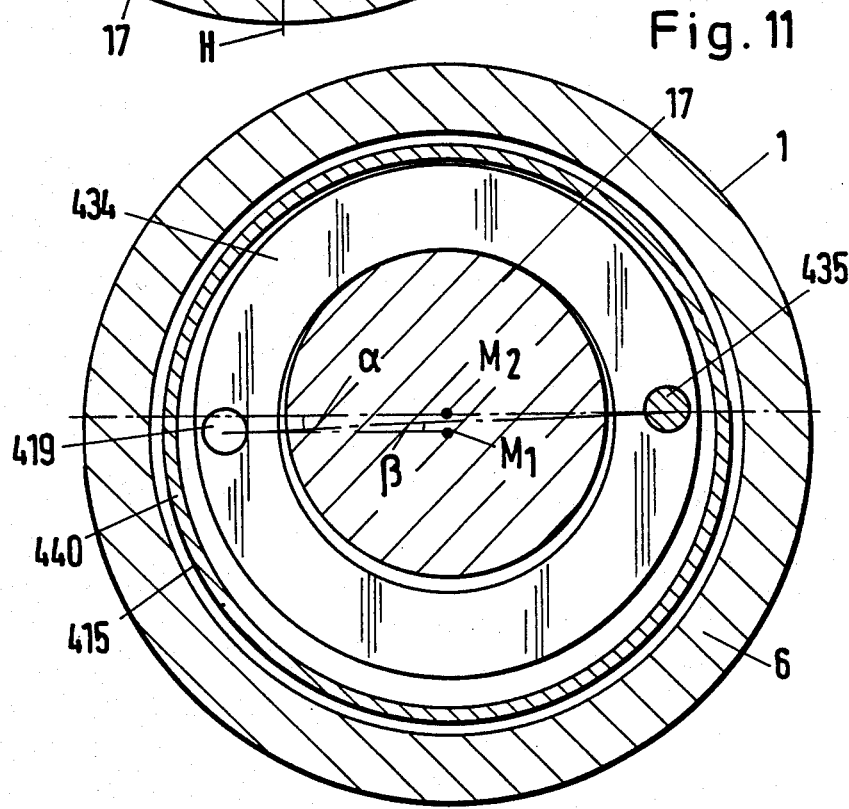
FIG. 11 is a similar transverse vertical sectional view but showing the sleeve in a different angular position.
Figure 12:
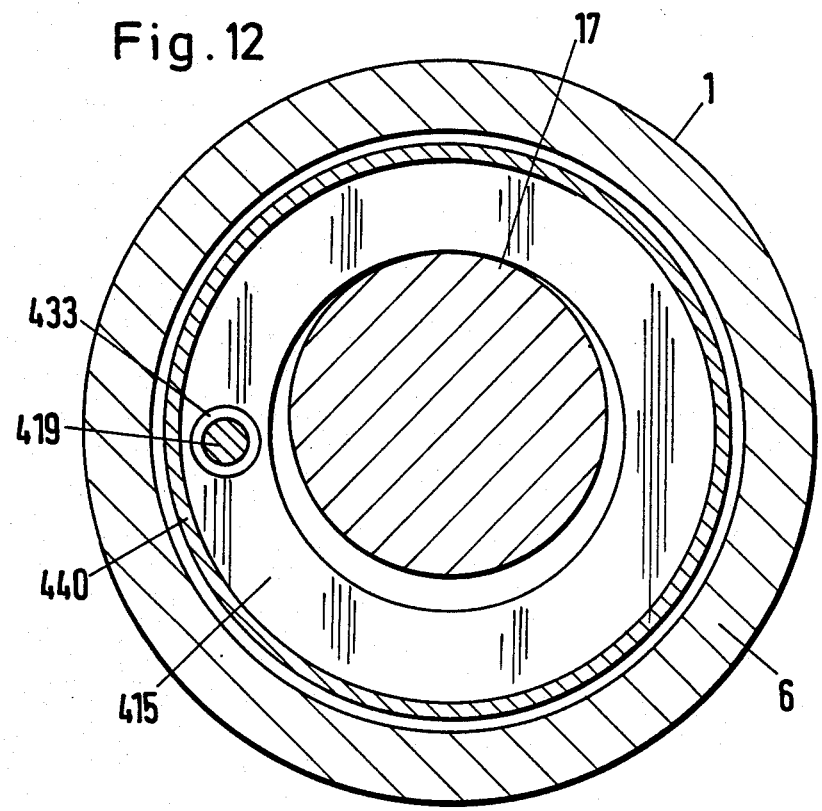
FIG. 12 is a transverse vertical sectional view as seen in the direction of arrows from the line G—G of FIG. 9 with the sleeve shown in its lowermost position.

FIG. 11 shows the manner in which the axis $M_1$ of the sleeve 415 can perform two pivotal movements with reference to the axis $M_2$ of the stub 17 in order to move downwardly. The line which connects the axis of the pivot member 435 with the axis of the pivot member 419 changes its inclination through the angle alpha in response to pivoting of the sleeve 415 from the position of FIG. 10 to that which is shown in FIG. 11, i.e., in response to pivoting of the ring-shaped levers 434 and 434a about the common axis of the pivot members 435 and 435a. The line which connects the common axis of the pivot members 419 and 419a with the axis $M_1$ of the sleeve 415 is caused to cover an angle beta as a result of pivoting of the sleeve 415 from the position of FIG. 10 to that which is shown in FIG. 11. It will be seen that such composite pivotal movement of the sleeve 415 results in a negligible movement of the axis $M_1$ from the plane H.

The improved roll is susceptible of many additional modifications. For example, the hydrostatic supporting elements 9 can have a circular shape and each such element can be acted upon by a single cylinder and piston assembly. Moreover, the supporting means 8 including a row of hydrostatic supporting elements 9 or analogous supporting elements can be replaced with an elongated plenum chamber. The configuration of the shell 6 and/or its movements relative to the carrier can be regulated in any one of a number of known manners. The pivot members which are supported by the carrier need not be anchored directly in the carrier but can be mounted on ring-shaped holders which, in turn, are non-rotatably mounted on the carrier; this renders it possible to employ a carrier having a constant diameter or unchanging cross-sectional area from end to end. The pivot members can be non-rotatably mounted in the respective sleeves and are then turnable in the median portion of the carrier, in the retaining members of the carrier, in the carriages and/or in the levers. In the embodiments which are shown in FIGS. 5 to 8, the carriages can carry means for reducing friction with the adjacent surfaces of the guide means, e.g., pairs of hydrostatic bearing or supporting elements analogous to the elements 9. One such element can be provided at each side of each carriage 31, 331 and 331a. This can greatly reduce friction during movement of the carriages with reference to their guide means.

The levers 434, 434a enable the sleeves 415 to perform scissor-like movements which not only enable the sleeves to move up and down but also to maintain their axes $M_1$ in close or immediate proximity of the plane H regardless of the selected level of the shell 6. The utilization of two levers for each sleeve 415 contributes to reliability with which the axes of the sleeves are held against tilting and other stray movements relative to the respective stubs 17. The placing of levers into the spaces between the median portion of the carrier 403 and the flanges 422, as well as between the flanges 425 and the respective retaining members 423 ensures that the levers occupy little room and can be dimensioned in such a way (as considered radially of the stubs 17) that they can stand all anticipated stresses which arise in actual use of the pressure roll. Ring-shaped levers are preferred at this time because their stability is high and because their inner and outer diameters can be readily selected in such a way that one ensures the aforediscussed optimum relationships between the widths of the clearances or plays $x_1$, $x_2$ and $x_3$. Such plays ensure that all or practically all radial movements of the shell 6 with reference to the carrier 403 result in a pivoting of the levers relative to the carrier as well as in a pivoting of the sleeves 415 with reference to the respective pairs of levers. This is desirable and advantageous on the aforediscussed grounds, i.e., because the axes of the sleeves 415 remain in or close to the plane H. The provision of cylindrical extensions 440, 441 (and the establishment of the corresponding clearances or plays $x_2$) also contributes to a higher predictability of optimum displacement of the sleeves in response to a raising or lowering of the shell 6, i.e., in such a way that the axes of the sleeves will remain in or close to the plane H in which the shell 6 transmits forces to or receives forces from the neighboring roll and/or from the running web or webs in the nip of the shell 6 and the adjoining roll 2.

When the supporting device 8 is idle, the sleeves 415 can rest directly on the respective stubs 17.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A roll capable of undergoing controlled deformation, comprising an elongated carrier; a hollow cylindrical shell surrounding and rotatable relative to said carrier, said shell having first and second end portions; supporting means interposed between said carrier and said shell intermediate said end portions; a tubular element interposed between said carrier and each of said end portions, said elements having limited freedom of movement with reference to said carrier in the radial direction of said shell; and means for pivotally connecting said elements to said carrier, said connecting means defining for said elements a pivot axis which is substantially parallel to said carrier and is spaced apart from said supporting means in the circumferential direction of said shell.

2. The roll of claim 1, further comprising means for non-rotatably holding said carrier and antifriction bearing means interposed between said elements and the respective end portions of said shell.

3. The roll of claim 1, wherein said pivot axis is angularly offset from said supporting means by substantially 90 degrees.

4. The roll of claim 1, wherein said connecting means includes a pivot member for each of said elements, said pivot members defining said axis and being non-rotatably secured to said carrier, said elements being oscillatable with reference to the respective pivot members.

5. The roll of claim 1 wherein said carrier comprises a median portion within said shell, two stubs which flank said median portion and are surrounded by the respective elements, and a substantially radially disposed shoulder between said median portion and each of said stubs, said having portions projecting beyond said shoulders and pivotably mounting the respective elements.

6. The roll of claim 1, wherein said carrier includes a median portion within said shell and two retaining members flanking said median portion, each of said elements being disposed between said median portion and one of said retaining members, said connecting means including coaxial pivot members having portions projecting from said retaining members and pivotably mounting the respective elements.

7. The roll of claim 6, wherein said retaining members include discs with means for sealingly engaging the respective elements; and further comprising antifriction bearings between said elements and the respective end portions of said shell, each of said bearings being disposed between said median portion and one of said discs.

8. The roll of claim 1, wherein said carrier comprises a median portion within said shell and two retaining portions flanking said median portion, each of said elements being disposed between said median portion and one of said retaining portions, said connecting means comprising four coaxial pivot members including a pair of pivot members on said median portion and a pivot member on each of said retaining portions, each of said elements being mounted on one of said pair of pivot members and on the pivot member on the respective retaining portion.

9. The roll of claim 1, wherein at least one of said elements includes a hollow core and two flanges flanking said core, said core being integral with one of said flanges.

10. The roll of claim 1, wherein said supporting means includes means for applying to said shell a force in a predetermined direction substantially radially of said shell; and further comprising means for movably mounting said connecting means on said carrier, said mounting means defining for said connecting means a path which is substantially parallel to said direction.

11. The roll of claim 10, wherein said mounting means comprises guide means which defines said path and is provided on said carrier, and a carriage for each of said elements, said carriages being reciprocable along said path and said connecting means being provided on said carriages.

12. The roll of claim 11, wherein said carrier comprises a median portion within said shell and two shoulders provided on said median portion and each facing toward one of said elements, said guide means including grooves provided in said shoulders and said carriages being reciprocable in the respective grooves.

13. The roll of claim 1, further comprising a lever for each of said elements, said connecting means being provided on said levers and further comprising fulcra connecting said levers to said carrier and defining a second axis which is substantially parallel to said pivot axis, said axes being disposed substantially diametrically opposite each other with reference to the axis of said shell.

14. The roll of claim 13, wherein said carrier has two shoulders facing said elements and said elements have end faces confronting the respective shoulders, each of said levers being disposed between one of said shoulders and the respective end face.

15. The roll of claim 13, wherein said carrier comprises two retaining members and said elements are disposed between said retaining members, each of said levers being disposed between one of said retaining members and the respective element.

16. The roll of claim 13, wherein each of said levers includes a ring and said carrier includes two stubs each of which is surrounded with play by the respective ring and the respective element.

17. The roll of claim 16, wherein the play between said elements and the respective stubs exceeds the play between said stubs and the respective rings.

18. The roll of claim 17, wherein at least one of said elements includes a portion surrounding the respective lever with a play which is smaller than the play between the respective element and the corresponding stub.

19. The roll of claim 18, wherein the sum of the play between said portion of said one element and the respective ring plus the play between such ring and the respective stub exceeds the maximum play of the respective element with reference to the corresponding stub.

20. The roll of claim 1, wherein said supporting means is operative to apply to said shell a force in a predetermined direction substantially radially of said shell; and further comprising stabilizing means for said shell, said stabilizing means including a first stabilizing unit operating between said shell and/or said elements on the one hand and said carrier on the other hand, and a second stabilizing unit disposed substantially diametrically opposite said first unit and operating between said shell and/or said elements on the one hand and said carrier on the other hand, said units cooperating to at least limit the extent of movability of said shell with reference to said carrier transversely of said predetermined direction.

21. The roll of claim 20, wherein said stabilizing means includes hydrostatic stabilizing elements.

22. The roll of claim 20, wherein said supporting means includes a portion at least of said first stabilizing unit.

23. The roll of claim 20, wherein said first unit includes means for applying to said shell a force in said predetermined direction and said second unit includes means for applying to said shell a force counter to said predetermined direction.

24. The roll of claim 20, wherein at least said second unit includes at least one cylinder and piston assembly interposed between at least one of said elements and said carrier.

25. The roll of claim 24, wherein said assembly includes a piston on said one element, said carrier having a cylinder chamber receiving said piston with substantial play in the circumferential direction of said one element.

26. The roll of claim 1, wherein said carrier has at least one first surface adjacent each of said elements and each of said elements has at least one second surface adjacent one first surface of said carrier; and further comprising friction bearing members interposed between said first and the respective second surfaces, said friction bearing members overlapping relatively small portions of the respective first and second surfaces.

27. The roll of claim 26, wherein one friction bearing member for each of said elements includes an annulus which surrounds said connecting means.

28. The roll of claim 26, wherein said friction bearing members include a first set of three bearing members interposed between one of said elements and said carrier and a second set of three bearing members interposed between said carrier and the other of said elements.

29. The roll of claim 28, wherein the bearing members of at least one of said sets are equidistant from each other in the circumferential direction of the respective element.

30. The roll of claim 26, wherein said carrier includes two retaining members flanking said elements and each of said retaining members has one of said first surfaces, each of said retaining members including a sealing ring engaging the adjacent second surface of the respective element and said friction bearing members including members disposed within the confines of said sealing rings.

31. A roll capable of undergoing controlled deformation, comprising an elongated carrier; a hollow cylindrical shell surrounding and rotatable relative to said carrier, said shell having first and second end portions; supporting means interposed between said carrier and said shell intermediate said end portions; a tubular element rotatably connected with at least one of said end portions, said element having limited freedom of movement with reference to said carrier in the radial direction of said shell; and means for pivotally mounting said element, said mounting means defining for said element a pivot axis which is substantially parallel to said carrier.

32. The roll of claim 31, wherein said pivot axis is spaced from said supporting means in the circumferential direction of said shell.

33. The roll of claim 32, further comprising an additional tubular element rotatably connected with the other of said end portions, and additional mounting means for pivotally mounting said other element on said pivot axis.

34. The roll of claim 31, further comprising means for non-rotatably holding said carrier and anitfriction bearing means interposed between said element and said one end portion.

35. The roll of claim 31, wherein said pivot axis is angularly offset from said supporting means by substantially 90°.

36. The roll of claim 31, wherein said mounting means includes a pivot member for said element, said pivot member defining said axis and being non-rotatable.

37. The roll of claim 31, wherein said carrier has a substantially radially disposed face which confronts said element, said mounting means including a pivot member which projects beyond said face and pivotally mounts said element.

38. The roll of claim 31, wherein said carrier has a retaining member which is disposed outwards of said element as considered axially of said carrier, said mounting means including a pivot member which projects from said retaining member and pivotally mounts said element.

39. The roll of claim 38, wherein said retaining member includes a disc with sealing means arranged to engage said element.

40. The roll of claim 31, wherein said carrier has a retaining portion which is disposed outwards of said element as considered axially of said carrier and a median portion which is disposed inwards of said element, said mounting means including a first pivot member on said median portion and a second pivot member on said retaining portion, and said first and second pivot members being substantially coaxial, said element being mounted on both of said pivot members.

41. The roll of claim 31, wherein said element includes a hollow core and two flanges flanking said core, said core being integral with one of said flanges.

42. The roll of claim 31, further comprising means for moving said mounting means along a path extending substantially radially of said shell.

43. The roll of claim 42, wherein said moving means comprises guide means which defines said path, and a carriage for said element, said carriage being reciprocable along said path and said mounting means being provided on said carriage.

44. The roll of claim 43, wherein said guide means includes a groove provided in said carrier and said carriage is reciprocable in said groove.

45. The roll of claim 31, further comprising a lever for said element, and a fulcrum for said lever defining a second axis which is substantially parallel to said pivot axis.

46. The roll of claim 45, wherein said axes are disposed substantially diametrically opposite each other with reference to the axis of said shell.

47. The roll of claim 45, wherein said carrier has a first face and said element has a second face confronting said first face, said lever being disposed between said faces.

48. The roll of claim 45, wherein said carrier has a retaining member which is disposed outwards of said element as considered axially of said carrier, said lever being disposed between said retaining member and said element.

49. The roll of claim 45, wherein said lever includes a ring and said carrier includes a stub which is surrounded with play by said ring and said element.

50. The roll of claim 49, wherein the play between said element and said stub exceeds the play between said stub and said ring.

51. The roll of claim 50, wherein said element includes a portion surrounding said lever with a play which is smaller than the play between said element and said stub.

52. The roll of claim 51, wherein the sum of the play between said ring and said portion of said element plus the play between said ring and said stub exceeds the maximum play of said element with reference to said stub.

53. The roll of claim 31, wherein said supporting means is operative to apply to said shell a force in a predetermined direction substantially radially of said shell; and further comprising stabilizing means for at least limiting the extent of movement of said shell with reference to said carrier transversely of said predetermined direction.

54. The roll of claim 53, wherein said stabilizing means includes hydrostatic stabilizing elements.

55. The roll of claim 53, wherein said supporting means includes a portion of said stabilizing means.

56. The roll of claim 53, wherein said stabilizing means includes a first unit for applying to said shell a force in said predetermined direction and a second for applying to said shell a force counter to said predetermined direction.

57. The roll of claim 53, wherein said stabilizing means includes a cylinder-and-piston assembly which is interposed between said element and said carrier.

58. The roll of claim 57, wherein said assembly includes a piston on said element, said carrier having a cylinder chamber receiving said piston with substantial play in the circumferential direction of said element.

59. The roll of claim 31, further comprising friction bearing members interposed between, said overlapping relatively small portions of, said carrier and said element.

60. The roll of claim 59, wherein one of said friction bearing members includes an annulus which surrounds at least a portion of said mounting means.

61. The roll of claim 59, wherein a set of three friction bearing members is interposed between said carrier and said element.

62. The roll of claim 61, wherein the bearing members of said set are substantially equidistant from each other in the circumferential direction of said element.

63. The roll of claim 59, wherein said carrier has a retaining member which is disposed outwards of said element as considered axially of said carrier, said retaining member including a sealing ring which engages said element, and at least one of said friction bearing members being disposed within the confines of said sealing ring.

* * * * *

Disclaimer

4,827,584—Josef Pav; Reinhard Wenzel, both of Krefeld, Fed. Rep. of Germany., PRESSURE ROLL FOR USE IN CALENDARS. Patent dated May 9, 1989. Disclaimer filed Dec. 19, 1991, by the assignee Kleinewefers GmbH.

Hereby enters this disclaimer to claims 1-4, 20-24, 31-36 and 53-57 of said patent.

[ *Official Gazette January 28, 1992* ]